United States Patent [19]
Ciardelli et al.

[11] 3,995,142
[45] Nov. 30, 1976

[54] DEFOGGING REAR WINDOW PANE FOR MOTOR VEHICLES

[75] Inventors: Umberto Ciardelli; Ivano Buoncristiani, both of Vasto (Chieti), Italy

[73] Assignee: Societa Italiana Vetro Slv S.p.A., Vasto (Chieti), Italy

[22] Filed: June 7, 1974

[21] Appl. No.: 477,362

[30] Foreign Application Priority Data
June 18, 1973    Italy.................................. 50890/73

[52] U.S. Cl. ................................ 219/522; 52/171;
  219/203; 219/541; 219/543; 219/547;
  338/322
[51] Int. Cl.² ...................... H05B 3/06; E06B 7/12;
  B60J 1/20; A47L 1/16
[58] Field of Search .......... 219/203, 522, 547, 543,
  219/541; 52/171; 338/328, 322, 308, 309,
  314

[56] References Cited
UNITED STATES PATENTS 2,052,527   8/1936   Cohen............................ 219/203 X
2,526,327   10/1950  Carlson........................... 219/547 X
2,827,538   3/1958   Polis et al. ..................... 219/522 X
3,813,519   5/1974   Jochim et al. ................... 219/543 X Primary Examiner—A. Bartis

[57] ABSTRACT

A defogging and defrosting rear window pane for motor vehicles has a plurality of spaced heating elements embedded therein. A relatively short metallic collector having a circular segment configuration is provided in each peripheral side of the window pane at opposite margins thereof. The central heating element extends between the collectors in a rectilinear path. Additional heating elements above and below the central element have a rectilinear central portion parallel to the central element and are connected to the collectors by end portions converging on the respective collectors. The respective collectors have an appendix extending outwardly beyond the window weatherstripping to serve as a terminal for connection to a power source.

1 Claim, 3 Drawing Figures

DEFOGGING REAR WINDOW PANE FOR MOTOR VEHICLES

The invention refers to the class of selfdefogging and -defrosting panes for the rear windows of motor vehicles, said panes incorporating a heating system of wires.

In the hitherto known panes of this class, said heating system is formed by a plurality of straight resistor wires running horizontally between two collector strips extending over the whole length or at least over the greater portion of the vertical lateral borders of the pane. Such long collectors are unseemly and disturbing to the sight, and therefore they have to be concealed under the weatherstrips of the rear window. Since these collectors were not embedded in the window pane, they were subject to atmospheric corrosion and chemical interaction with the weather-strip with which they were in contact.

The object of the invention is to provide an improved defogging and defrosting pane for the rear windows of motor vehicles, which obviates the above outlined deficiencies and presents, in addition to a more pleasant aspect, the advantage of a more thorough and rapid defogging and defrosting action.

The improvement consists essentially in making said collectors very short and incorporating them into said pane, at two opposite margins thereof. Owing to this arrangement, only the central one of the heating wires interconnecting them follows a rectilinear path. All the other wires, although running for a certain stretch parallel to it in a conveniently spaced relationship, will have to converge towards said short collectors in the vicinity of the margins, where the latter are located. Consequently, the wires are rendered longer and therefore heat a larger area than if they were straight as in the conventional defogging and defrosting rear windows.

By rendering these collectors small, also the possibility is realized to position them externally to the pane margin, which is to be covered by the weatherstrips, without disturbing the general aspect of the rear windows, and to provide for their connection with the power source by supplying them with an appendix projecting beyond the edge of the pane and which is rendered invisible because it is covered by the weatherstrip.

For a purely illustrative and in no way limitative purpose an embodiment of the invention will now be described with reference to the accompanying drawings, wherein FIG. 1 shows schematically the left portion of the pane of a motor car rear window according to the invention, the other, not represented part being its mirror image.

Figure 1:
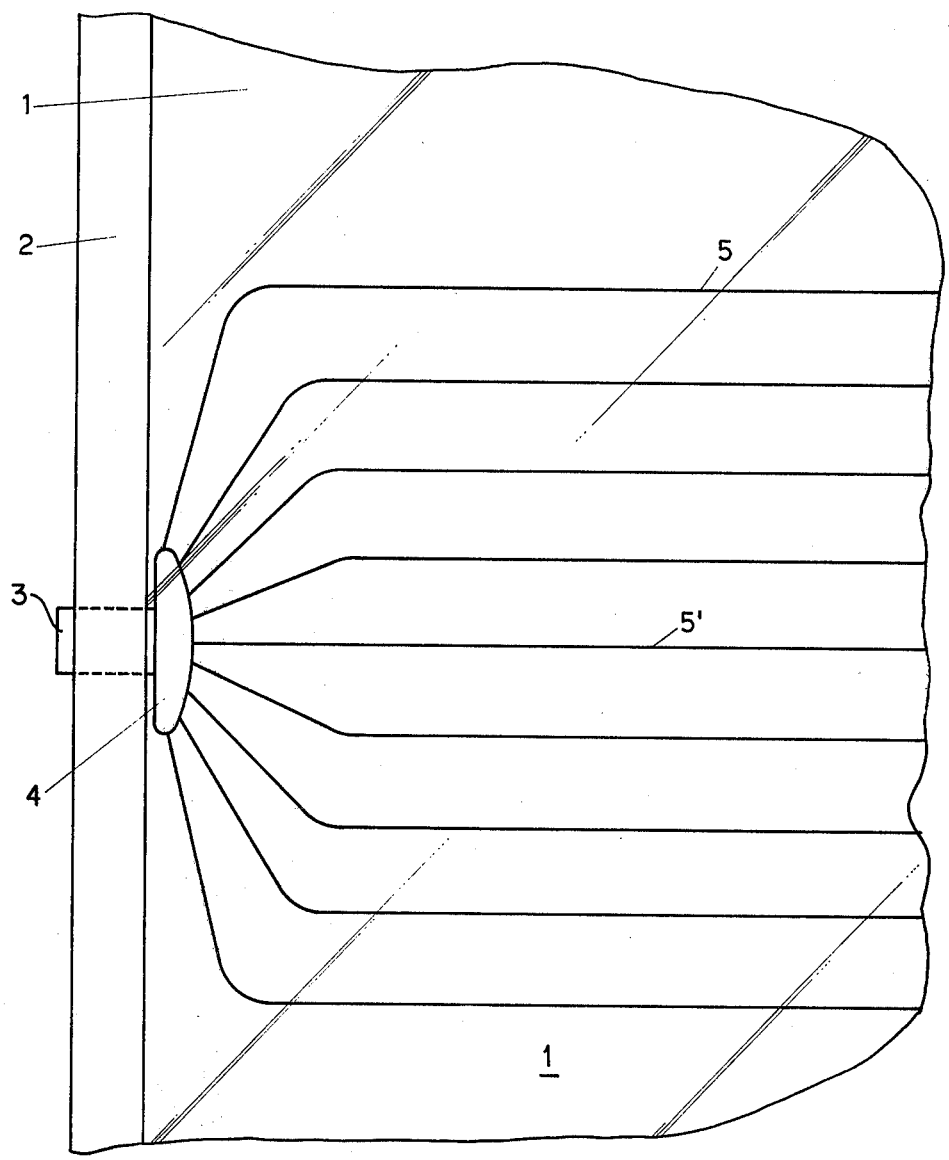
Figure 2:
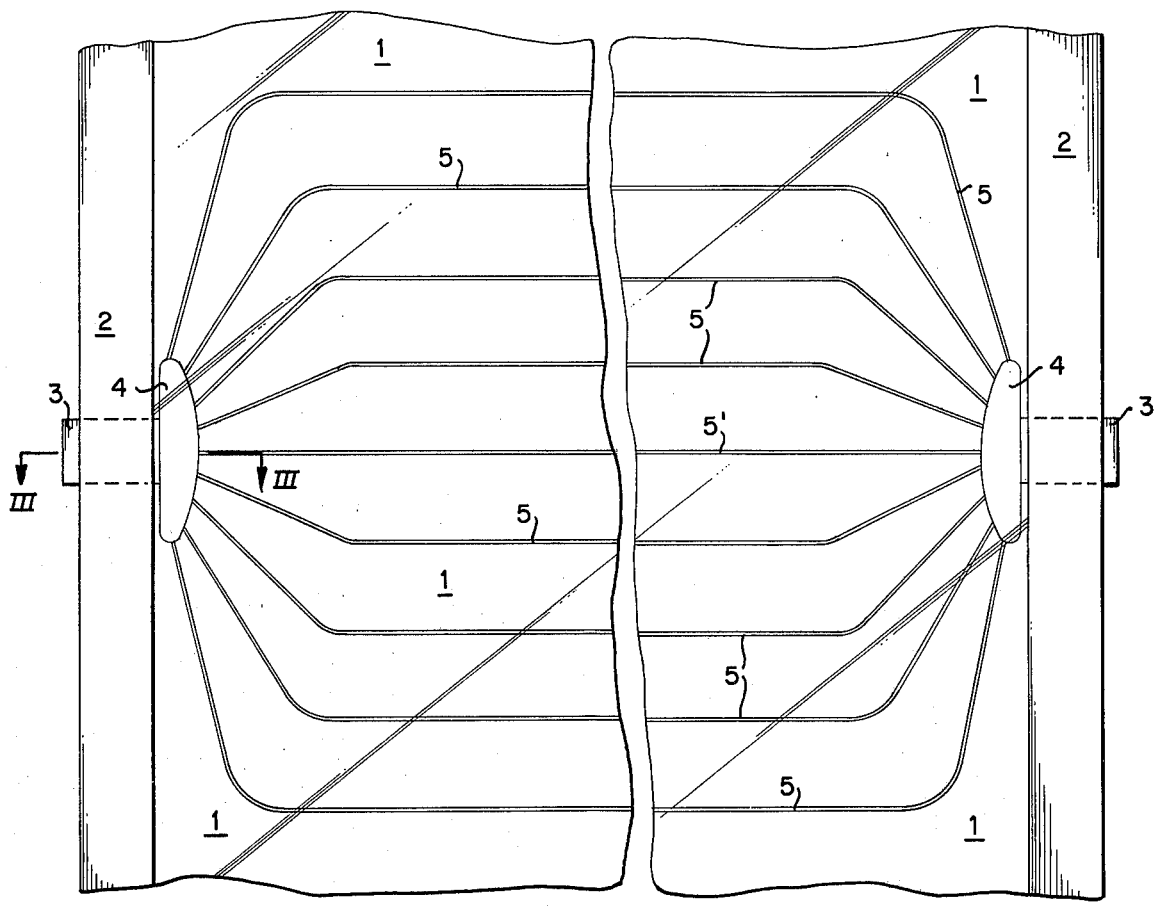
FIG. 2 shows the entire pane of a motor car rear window in accordance with this invention.
Figure 3:
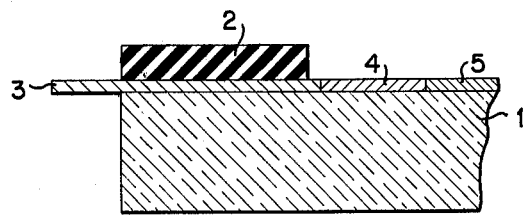
FIG. 3 is a sectional view taken along line III—III of FIG. 2.

With reference to the figures, the window pane is indicated at 1, and a weatherstrip running along the margin of its lower surface is indicated at 2. The metallic collector body 4 is embedded in the pane adjacently to the edge of the latter, but just outside the pane area which is to be covered by the weatherstrip. The metallic appendix 3 is formed by a platelet integral with the collector and projecting beyond the pane edge for the connection of said collector with one conductor of the power supply.

In the embodiment shown, each connector is given the contour of a circular segment, with its chord connected with the appendix and its convex side turned inward and connected with the corresponding ends of the heating wires.

Of these, only the central wire 5' interconnecting the collector shown with its not shown counterpart, located on the opposite margin of the window pane, follows a rectilinear path. The other wires 5 run above and below said central wire in a parallel and mutually spaced away rectilinear configuration only for a given stretch, to converge at both ends of said stretch towards the collectors and terminate at the convex portion of the latter. Obviously also the heating wires are embedded in the pane.

The collectors can be given shapes different from that just illustrated. The number of the heating wires may also be increased, without increasing the number of their junctions with the collector, by doubling each wire, that is to say by connecting another wire in parallel with it at a distance from said junctions. Also on each of the opposite sides of the pane more than one collector may be placed. All these and other variants are obvious to the experts in the art and therefore encompassed within the scope of the invention.

What is claimed is:

1. In a defogging and defrosting window pane having a plurality of heating elements embedded in said window pane, the improvement comprising a relatively short vertical metallic collector embedded in each peripheral side of said window pane at opposite margins thereof for connecting said heating elements on each respective side, a central heating element being connected to each collector in a rectilinear path and additional heating elements above and below said central heating element, said additional heating elements each having a rectilinear central portion arranged in parallel spaced relation to said central heating element and being connected to each collector near the periphery of said window-pane between said opposite margins by end portions converging on said respective collectors and spaced from each other, said collectors having a circular segment configuration, the convex sides thereof facing each other at opposite ends of the window pane and being connected to said heating elements and the chord side thereof being connected to an electrically conductive appendix extending through the outside of the window-pane and serving as a terminal for connecting the respective collectors to a source of electrical power, and weatherstripping on the finished window on each side of said pane, each collector extending inwardly beyond the inward periphery of said weatherstripping.

* * * * *